United States Patent
Marupaduga et al.

(10) Patent No.: US 10,111,186 B1
(45) Date of Patent: Oct. 23, 2018

(54) CONTROLLABLE TRANSFORMER TAP TO DYNAMICALLY ADJUST POWER DISTRIBUTION LEVELS IN WIRELESS NETWORKS

(71) Applicant: Sprint Communications Company L.P., Overland Park, KS (US)

(72) Inventors: Sreekar Marupaduga, Overland Park, KS (US); Nicholas David Caola Kullman, Kansas City, MO (US); Eugene S. Mitchell, Jr., Blue Springs, MO (US); Andrew Mark Wurtenberger, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/377,751

(22) Filed: Dec. 13, 2016

Related U.S. Application Data

(62) Division of application No. 13/683,220, filed on Nov. 21, 2012, now Pat. No. 9,635,617.

(51) Int. Cl.
*H04B 7/00* (2006.01)
*H04W 52/34* (2009.01)
*H04W 88/08* (2009.01)

(52) U.S. Cl.
CPC ............ *H04W 52/34* (2013.01); *H04W 88/08* (2013.01)

(58) Field of Classification Search
CPC .............................. H04W 52/34; H04W 88/08
See application file for complete search history.

(56) References Cited

U.S. PATENT DOCUMENTS

| | | | |
|---|---|---|---|
| 6,664,881 B1* | 12/2003 | Thompson | H01F 17/02 336/145 |
| 2007/0060062 A1* | 3/2007 | Wengerter | H04W 52/262 455/63.2 |
| 2009/0135074 A1* | 5/2009 | Yang | H01Q 1/246 343/766 |
| 2010/0041395 A1* | 2/2010 | Karabinis | H04B 7/18513 455/427 |
| 2010/0075688 A1* | 3/2010 | Watanabe | H04W 16/06 455/450 |
| 2011/0081943 A1 | 4/2011 | Tee et al. | |
| 2014/0221037 A1* | 8/2014 | Hassett | H04W 52/245 455/522 |

OTHER PUBLICATIONS

WO 2013/007276, Hassett, Brendan, Control of Transmitter Configuration for Base Station, WIPO, A1, Jan. 17, 2013, 30 pages.*

* cited by examiner

*Primary Examiner* — Xin Jia

(57) ABSTRACT

An apparatus and method are provided for dynamically changing power distribution levels to sectors in a cell site. A device, such as an eNodeB, radio network controller, or base station controller, provides instructions to an RF power splitter to adjust the power output in ratios, which changes the power distribution levels at the sectors. The power splitter contains a transformer and motor that can dynamically change the power output ratios based on the instructions received from the device. The resulting power outputs are distributed to the sectors.

8 Claims, 5 Drawing Sheets

CONTROLLABLE TRANSFORMER TAP TO DYNAMICALLY ADJUST POWER DISTRIBUTION LEVELS IN WIRELESS NETWORKS

CROSS-REFERENCE TO RELATED APPLICATIONS

This application is a divisional of U.S. application Ser. No. 13/683,220, which was filed on Nov. 21, 2012. The entirety of the aforementioned application is incorporated by reference herein.

BACKGROUND OF THE INVENTION

Current power splitters, used for radio frequency (RF) applications, have static power distribution levels. Because of these static power distribution levels, power distribution is restricted to a set amount. If the power output needs to be changed, unique power development and selection is required that results in increased lead times, decreased deployment agility, and increased deployment costs. Overall, the current process of changing static power distribution levels from one type to another type is an inflexible solution. Therefore, a solution is desired that would allow for power distribution levels to be changed based on varying cell site coverage and capacity needs.

SUMMARY

Embodiments of the invention are defined by the claims below, not this summary. A high-level overview of various aspects of embodiments of the invention is provided here for that reason, to provide an overview of the disclosure and to introduce a selection of concepts that are further described below in the detailed description section. This summary is not intended to identify key features or essential features of the claimed subject matter, nor is it intended to be used as an aid in isolation to determine the scope of the claimed subject matter.

Embodiments of the present invention relate generally to an apparatus and method for dynamically changing power distribution levels to sectors in a cell site. A network device monitors the power needs to each sector in a cell site. Based on the power needs, the power for each sector is changed to accommodate the mobile users in each sector.

Embodiments of the present invention enable wireless carriers to dynamically change power distribution levels at cell sites. A device provides instructions to a radio frequency (RF) power splitter, wherein the RF power splitter provides power in ratios to each sector in a cell site.

BRIEF DESCRIPTION OF THE SEVERAL VIEWS OF THE DRAWINGS

Illustrative embodiments of the present invention are described in detail below with reference to the included drawing figures, wherein.

DETAILED DESCRIPTION

Embodiments of the present invention relate generally to an apparatus and method for dynamically changing power distribution levels to sectors at a cell site. A network device monitors the power needs to each sector in a cell site. Based on the power needs, the network device sends instructions to components within the cell site to change the power distribution in each sector. The components include a radio frequency (RF) power splitter, transformer, and motor. The power for each sector is changed to accommodate the mobile users in each sector.

In a first aspect, a method for dynamically controlling power distribution is provided that includes distributing, by a radio frequency (RF) power splitter, power in ratios among sectors in a cell site in a wireless telecommunications network. At the RF power splitter, communications from a device is received that instructs to set power distribution levels. A transformer in the RF power splitter operates to change power ratios. A number of turns in a coil in the transformer are changed to change power output. Power among sectors is re-distributed based on the instructions received from the device.

In another aspect, a method for adjusting power distribution levels in a wireless telecommunications network is provided that includes determining a number of users per sector in a cell site by a network device in the wireless telecommunications network. With the network device, historical operational measurement data is collected from each sector. A power distribution level per sector is determined based on at least one of the number of users per sector and the historical operational measurement data. The network device and a radio frequency (RF) power splitter communicate over an Antenna Interface Standards Group (AISG) protocol. Instructions are provided from the network device to the RF power splitter to change the power distribution levels sectors in the cell site.

Figure 1:
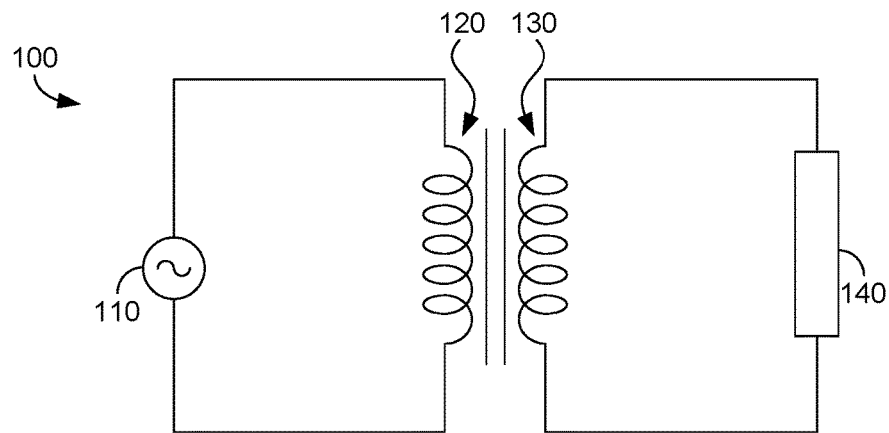
FIG. 1 is an exemplary dual coil electrical transformer, implemented in accordance with an embodiment of the present invention.

In FIG. 1, an electrical circuit 100 is shown with a voltage source 110, a transformer indicated by primary side 120 and primary side 130, and a load 140. As one of ordinary skill in the art understands, a voltage is provided to voltage source 110 that passes through a primary coil at primary side 120. From electromagnetic induction, a second voltage appears on a secondary coil at secondary side 130. From this second voltage, a voltage load appears at load 140. The illustration in FIG. 1 is a simplistic view of a transformer in use. In a practical sense, transformers are used to transfer electric energy from one circuit to another circuit through a change in voltage. As a result, transformers are important in the distribution of power.

The electromagnetic induction that occurs at sides 120 and 130 enables voltage changes to occur based on the number of coils in each side. The ratio of the number of turns in primary side 120 to the number of coils in second side 130 determines the ratio of voltages in the two coils. The idea here is to not explain the use of transformers but to lay a foundation for explaining embodiments of the present invention. A reader may find an abundance of literature on the explanation of transformers and their uses beyond the explanations contained herein.

Figure 2:
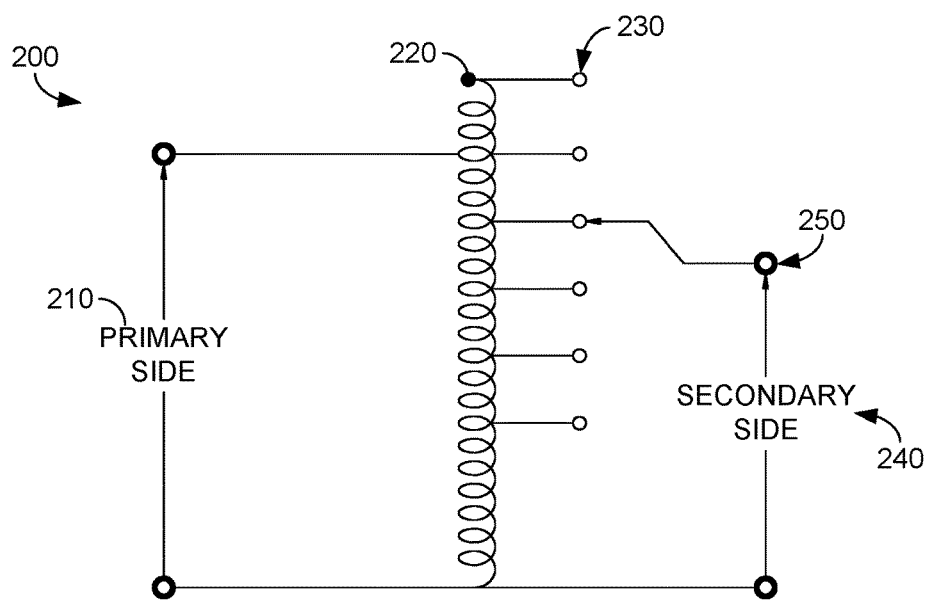
FIG. 2 is an exemplary single coil electrical transformer, implemented in accordance with an embodiment of the present invention.

Turning now to FIG. 2, an electrical circuit 200 is shown with a single coil transformer operating in circuit 200. The single coil transformer is also known as an autotransformer. In FIG. 2, circuit 200 has a primary side 210 that receives a voltage between the two terminals that bound primary side 210. The voltage is transferred to the single coil transformer 220. On one side of transformer 220, a set of taps 230 are provided to enable connections at various points along the side of transformer 220. On that same side of transformer 220, which is opposite of primary side 210, a secondary side 240 is shown. Secondary side 240, like primary side 210, receives voltage between two terminals that bound secondary side 240. However, secondary side 240 has a terminal 250 that can move in a lateral position to connect to one of the set of taps 230. Therefore, based on the voltage provided to primary side 210, a voltage appears at secondary side 240. The voltage that appears at secondary side 240 changes as terminal 250 moves to connect to a different member of taps 230. In an implementation of an embodiment of the present invention, a mechanical motor can be connected to terminal 250 to move it in a lateral position to change the voltage appearing at secondary side 240. Further, instructions can be received to change the voltage based on policies, historical data, or current needs. The idea here is to show in FIG. 2 that a single coil transformer can be used rather than a dual coil transformer. Further, the load or voltage that appears on secondary side 240 can be dynamically changed based on the movement of terminal 250 and the connection made between terminal 250 and one of the taps 230.

Figure 3:
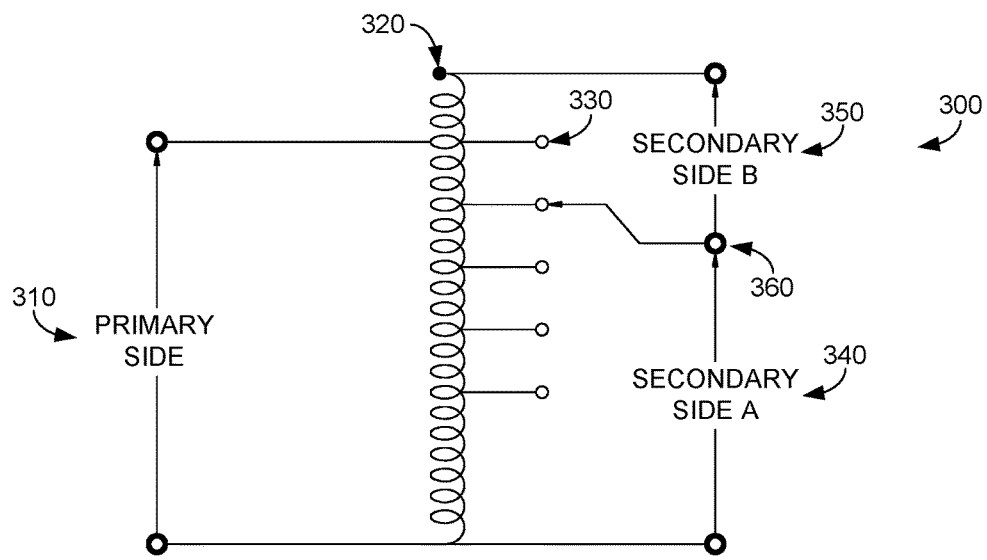
FIG. 3 is an exemplary single coil electrical transformer showing a 2-to-1 ratio configuration, implemented in accordance with an embodiment of the present invention.

In FIG. 3, an electrical circuit 300 is shown with a single coil transformer 320, similar to single coil transformer 220. Primary side 310, similar to primary side 210, receives an input voltage which results in output voltages appearing at secondary side A 340 and secondary side B 350. Circuit 300 can be said to provide power in a 2-to-1 ratio configuration.

Transformer 320 has a set of taps 330, similar to taps 230. Taps 330 provide various connection points along the coil of transformer 320. Taps 330 enable a connection with terminal 360. Terminal 360, similar to terminal 250, can dynamically move to have connections with different members of taps 330. Each different connection made between terminal 360 and one of the taps 330 results in a different voltages appearing at secondary side A 340 and secondary side B 350. Consequently, the input voltage appearing at primary side 310 typically equals the total output voltages appearing at secondary side A 340 and secondary side B 350. Therefore, an implementer could implement circuit 300 in an embodiment of the present invention and have the flexibility of varying the output voltages for particular uses.

Figure 4:
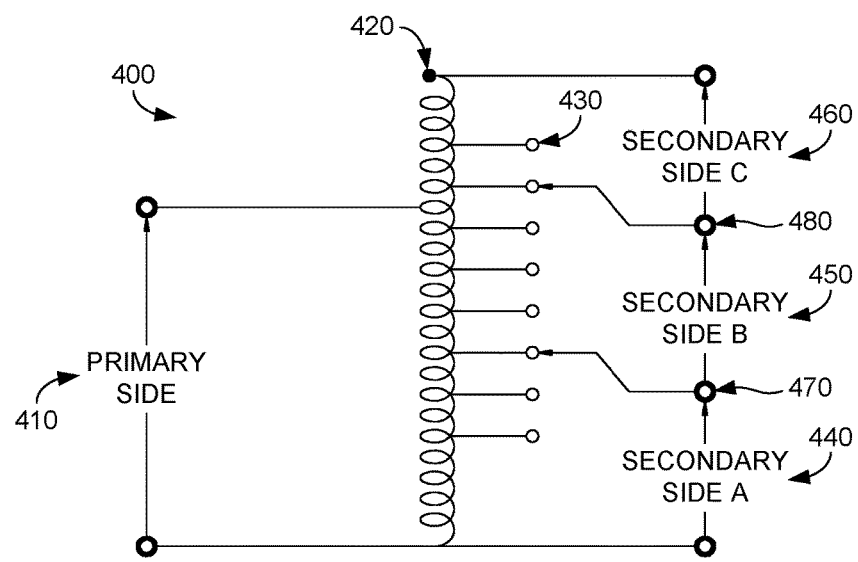
FIG. 4 is an exemplary single coil electrical transformer showing a 3-to-1 ratio configuration, implemented in accordance with an embodiment of the present invention.

Turning now to FIG. 4, an electrical circuit 400 is shown that receives an input voltage at primary side 410. This voltage passes through transformer 420 and results in voltages appearing at secondary side A 440, secondary side B 450, and secondary side C 460. Circuit 400 can be said to provide power in a 3-to-1 ratio configuration.

Transformer 420 has a set of taps 430, similar to taps 230 and 330. Taps 430 provide various connection points along the coil of transformer 420. Taps 430 enable a connection with terminals 470 an 480. Terminals 470 and 480, similar to terminals 250 and 360, can dynamically move independently of each other to have connections with different members of taps 430. The connection made between terminal 470 and one of the taps 430 and between terminal 480 and another of the taps 430 result in different voltages appearing at secondary side A 440, secondary side B 450, and secondary side C 460. Similar to FIG. 3, the input voltage appearing at primary side 410 typically equals the total output voltages appearing at secondary side A 440, secondary side B 450, and secondary side C 460. Therefore, an implementer could implement circuit 400 in an embodiment of the present invention and have the flexibility of varying the output voltages for particular uses. For example, one or more mechanical motors can be implemented and connected to terminals 470 and 480 to move them laterally to change the voltages appearing at secondary side A 440, secondary side B 450, and secondary side C 460.

Figure 5:
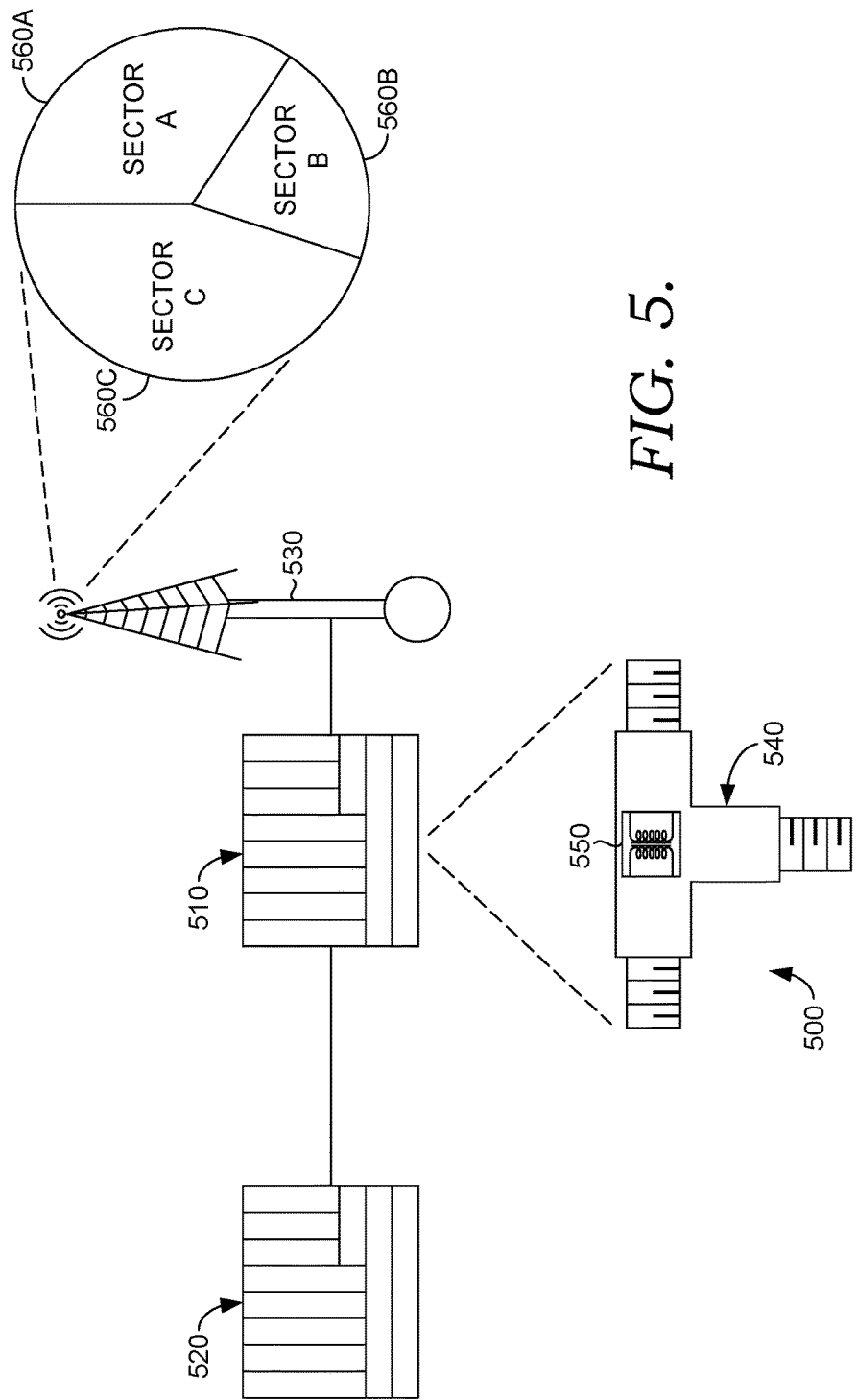
FIG. 5 is a process for dynamically controlling power distribution in accordance with an embodiment of the present invention.

In FIG. 5, an exemplary system 500, as found in a wireless telecommunication network, is shown with representative devices that are found in that network. System 500 includes a network device 510 connected to a control device 520 and a tower 530. Network device 510 can include various elements such as an Evolved Node B (eNodeB or eNB), a Node B, a base transceiver station (BTS), and a base station. Network device 510 can be found in wireless telecommunications network standards such as Long Term Evolution (LTE), Universal Mobile Telecommunications System (UMTS), and Global System for Mobile Communications (GSM), to name a few. Control device 520 can include various elements such as a radio network controller (RNC) and a base station controller (BSC). Although exemplary devices are named for network device 510 and control device 520, the list of devices is by no means limited to the named devices.

In an implementation of an embodiment of the present invention, network device 510 and control device 520 are not required to be implemented at the same time. In some embodiments, network device 510 may be implemented without control device 520. This configuration may exist when an eNodeB is implemented. Since control functions exist in the eNodeB, control device 520 may not be required. In other embodiments, both network device 510 and control device 520 may be implemented. This configuration may exist to allow the operation of the radio network controller and NodeB together and allow the operation of the base station controller and the base transceiver station together. Control functions exist in the radio network controller and base station controller.

Continuing with FIG. 5, network device 510 can include a radio frequency (RF) power splitter 540. However, RF power splitter 540 can also be shown external to network device 510 in a different embodiment. Whether RF power splitter 540 is contained within network device 510 or located external to network device 510, RF power splitter 540 can receive power on an input side and provide power on an output side simultaneously to multiple areas. RF power splitter 540 receives instructions from either network device 510 or control device 520. When those instructions are received, a transformer circuit 550, located in RF power splitter 540, operates to provide power output in ratios. Transformer circuit 550 is similar to the circuits described in FIGS. 3-4 above.

Once the power outputs are determined at transformer circuit 550, the power outputs are sent to tower 530 to establish the coverage for cell sectors 560a-c. Cell sectors 560a-c provide wireless telecommunications coverage to users. RF power splitter 540 can set the power for each sector based on the number of users in each sector and the operational measurement data for each sector. The power can also be determined with other criteria in addition to the number of users and the operational measurement data.

In an implementation of an embodiment of the present invention, RF power splitter 540 provides dynamic power distribution levels to a cell. The power distribution levels are mechanically adjusted by a motor. The motor can be controlled using the AISG protocol. Operational measurement data for the cell is stored and monitored by the eNodeB. In other embodiments, the RNC and BSC may be used to store data and monitor activities. Based on the historical data, the eNodeB can determine the power settings to apply within RF power splitter 540 to cater to the particular coverage and capacity needs for the sector. The change in power ratio is enacted by varying the number of turns of the coil in the internal transformer in transformer circuit 550 within RF power splitter 540.

In another implementation of an embodiment of the present invention, the eNodeB can determine the number of users per sector of a cell. For example, global positioning system (GPS) data along with azimuth information of the antennas serving the eNodeB can be used to determine the distribution of users in the sectors. As in other embodiments, historical operational measurement data is collected for each sector. The eNodeB can communicate with RF power splitter 540 using the AISG protocol. With the communication between the eNodeB and RF power splitter 540, eNodeB instructs RF power splitter 540 to set the power distribution levels. The power distribution levels can be altered on a periodic basis, such as hourly, daily, monthly, semi-annually, to name a few. The power distribution ratios are altered via an AISG-compatible motor operating in or with transformer circuit 550. Within transformer circuit 550, a tap located along the secondary side of the transformer is shifted to include fewer or additional turns in the transformer coil. By having fewer or additional turns of the transformer coil, the power output in transformer circuit 550 is altered. The power output to one sector is dependent upon the power output to the other sectors such that the total output to all the sectors equals the input power.

Figure 6:
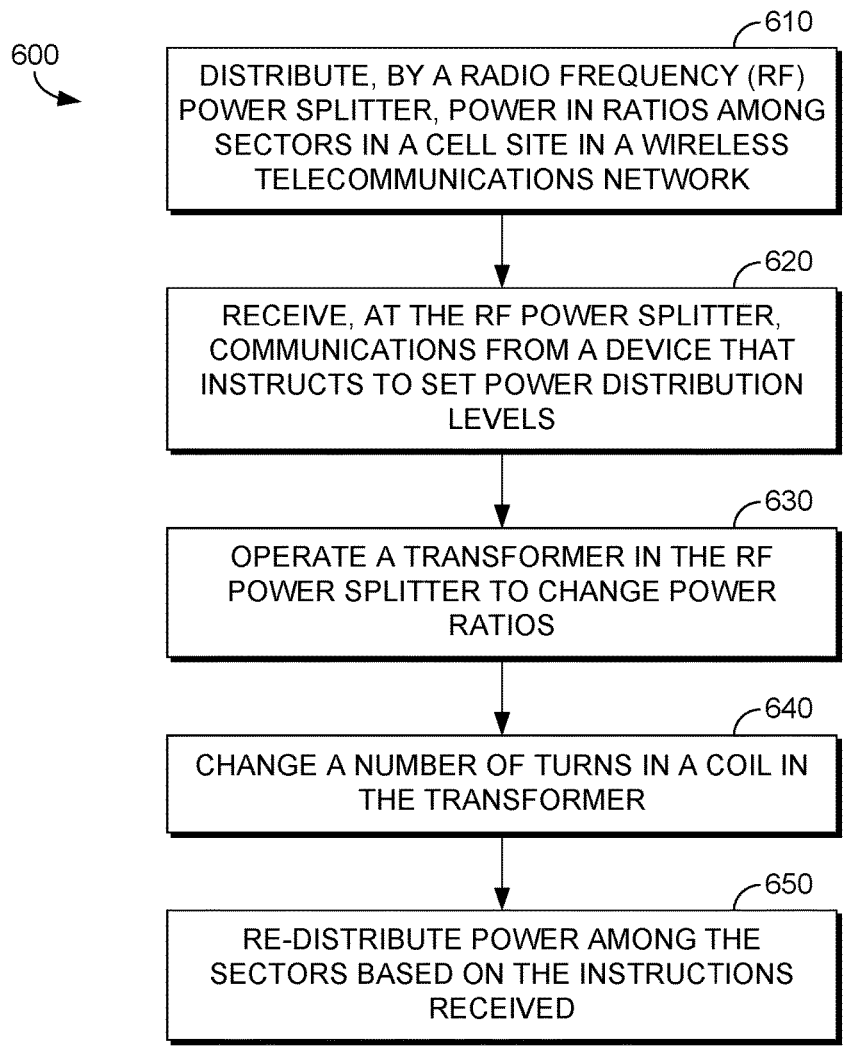
FIG. 6 is another process for adjusting power distribution levels in a wireless telecommunications network in accordance with an embodiment of the present invention.

Turning now to FIG. 6, a process for dynamically controlling power distribution is provided in a method 600. In a step 610, RF power splitter 540 distributes power in ratios among sectors 560a-c in a cell site in a wireless telecommunications network. RF power splitter 540 receives communications from network device 510 or control device 520. Network device 510 or control device 520 instructs RF power splitter 540 to set power distribution levels, in a step 620. In a step 630, transformer circuit 550 operates within RF power splitter 540 to change power ratios for sectors 560a-c. A number of turns in the transformer in transformer circuit 550 are changed (step 640) to re-distribute power among sectors 560a-c based on the instructions received from network device 510 or control device 520 (step 650).

Figure 7:
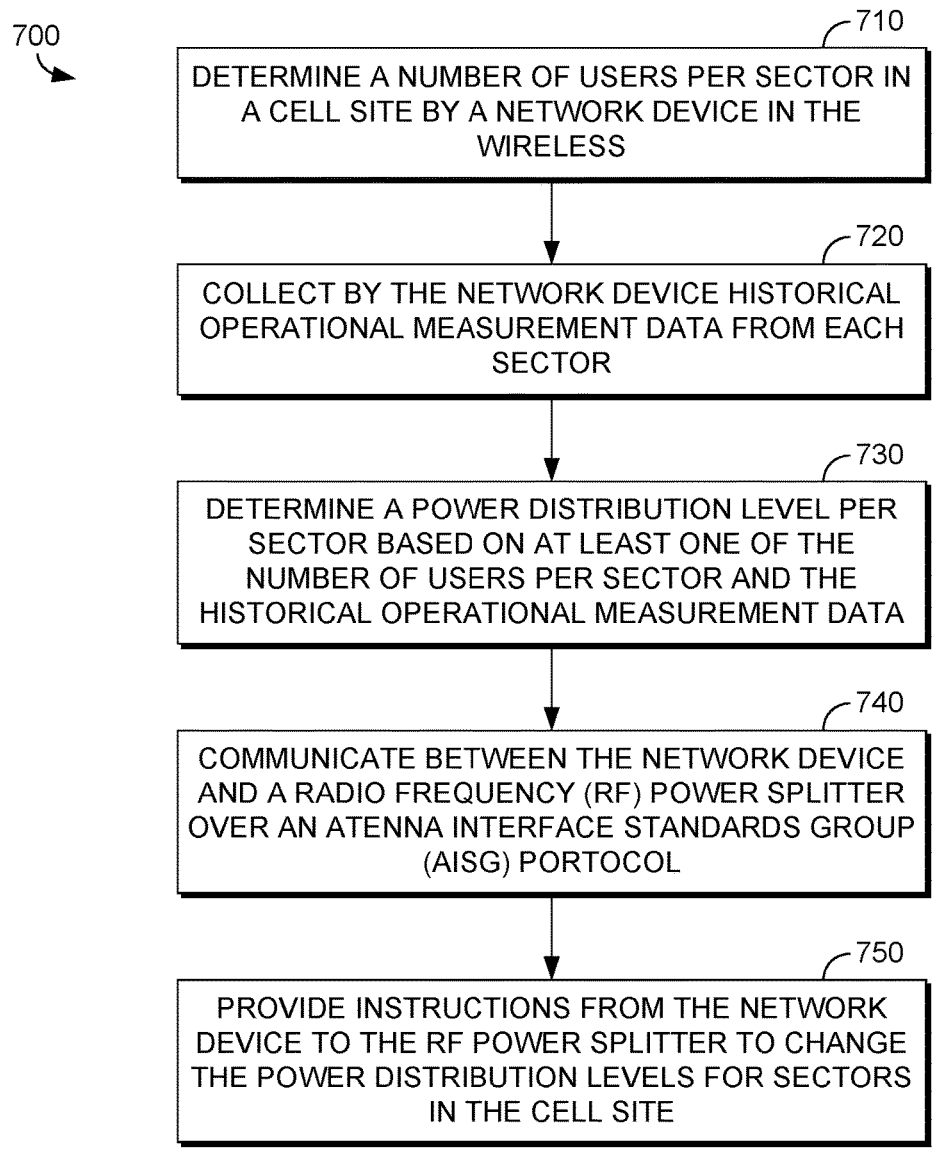
FIG. 7 is yet another process for adjusting power distribution levels in a wireless telecommunications network in accordance with an embodiment of the present invention.

In FIG. 7, a process for adjusting power distribution levels in a wireless telecommunications network is provided in a method 700. In a step 710, a number of users per sector is determined in a cell site by network device 510 or control device 520 in the wireless telecommunications network. Network device 510 or control device 520 collect historical operational measurement data from each sector, in a step 720. In a step 730, a power distribution level is determined based on at least one of the number of users per sector or the historical operational measurement data. Communications between network device 510 and RF power splitter 540, or control device 520 and RF power splitter 540 (through network device 510), occur over an AISG protocol, in a step 740. In a step 750, instructions from network device 510 or control device 520 is provided to RF power splitter 540 to change the power distribution levels for sectors 560a-c in the cell site.

Many different arrangements of the various components depicted, as well as components not shown, are possible without departing from the spirit and scope of embodiments of the present invention. Embodiments of the present invention have been described with the intent to be illustrative rather than restrictive. Certain features and subcombinations are of utility and may be employed without reference to other features and subcombinations and are contemplated to be within the scope of the claims.

The invention claimed is:

1. A method for adjusting power distribution levels in a wireless telecommunications network, comprising:
    determining a number of users per sector in a cell site by a network device in the wireless telecommunications network, wherein determining the number of users per sector comprises obtaining global positioning system (GPS) data for the users and obtaining azimuth information for antennas in the network device, and wherein the network device is selected from a group including an evolved node B (eNodeB), Node B, radio network controller (RNC), base transceiver station (BTS), and base station controller (BSC);
    collecting by the network device historical operational measurement data from each sector;
    determining a power distribution level per sector based on at least the number of users per sector, the historical operational measurement data, and other criteria, wherein the historical operational measurement data is at least per call measurement data;
    communicating between the network device and a radio frequency (RF) power splitter over an Antenna Interface Standards Group (AISG) protocol; and
    providing instructions from the network device to the RF power splitter to change the power distribution levels for two or more sectors in the cell site.

2. The method of claim 1, wherein the power distribution levels are changed on a periodic basis.

3. The method of claim 2, wherein the periodic basis is selected from a group including hourly, daily, weekly, monthly, and semi-annually.

4. The method of claim 1, further comprising changing the power distribution levels in the two or more sectors with an AISG-compatible motor in the RF power splitter.

5. A system for adjusting power distribution levels in a wireless telecommunications network, comprising:
    a network device in the wireless telecommunications network determines a number of users per sector in a cell site, wherein the network device obtains global positioning system (GPS) data for the users and obtains azimuth information for antennas in the network device, and wherein the network device is selected from a group including an evolved node B (eNodeB), Node B, radio network controller (RNC), base transceiver station (BTS), and base station controller (BSC);
    the network device collects historical operational measurement data from each sector;
    the network device determines a power distribution level per sector based on at least the number of users per sector and the historical operational measurement data, and other criteria, wherein the historical operational measurement data is at least per call measurement data;
    the network device communicates with a radio frequency (RF) power splitter over an Antenna Interface Standards Group (AISG) protocol; and the network device provides instructions to the RF power splitter to change the power distribution levels for two or more sectors in the cell site.

6. The system of claim 5, wherein the power distribution levels are changed on a periodic basis.

7. The system of claim 6, wherein the periodic basis is selected from a group including hourly, daily, weekly, monthly, and semi-annually.

8. The system of claim 5, further comprising an AISG-compatible motor in the RF power splitter changes the power distribution levels in the two or more sectors.

* * * * *